(12) United States Patent
Matyas et al.

(10) Patent No.: US 7,719,249 B2
(45) Date of Patent: May 18, 2010

(54) SOFT-START CIRCUIT AND METHOD THEREFOR

(75) Inventors: Ladislav Matyas, Horni Becva (CZ); Francois Lhermite, Lasserre (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 284 days.

(21) Appl. No.: 11/576,174

(22) PCT Filed: Jan. 28, 2005

(86) PCT No.: PCT/US2005/003396

§ 371 (c)(1),
(2), (4) Date: Mar. 28, 2007

(87) PCT Pub. No.: WO2006/085847

PCT Pub. Date: Aug. 17, 2006

(65) Prior Publication Data

US 2008/0246450 A1    Oct. 9, 2008

(51) Int. Cl.
*G05F 1/02* (2006.01)
*G05F 1/08* (2006.01)
(52) U.S. Cl. .................... 323/285; 323/288; 323/901; 363/49
(58) Field of Classification Search ............... 323/222, 323/238, 288, 282, 283, 284, 285, 286, 287, 323/901; 363/21.01, 21.08, 21.04, 21.1, 363/21.12, 21.11, 21.15, 21.17, 21.18, 49
See application file for complete search history.

(56) References Cited

U.S. PATENT DOCUMENTS

| 3,746,970 A * | 7/1973 | Van Cleave ............... 323/238 |
| 5,502,370 A * | 3/1996 | Hall et al. ............... 323/284 |
| 5,917,313 A * | 6/1999 | Callahan, Jr. ............ 323/288 |
| 6,377,480 B1 * | 4/2002 | Sase et al. ................ 363/49 |

* cited by examiner

*Primary Examiner*—Gary L Laxton
*Assistant Examiner*—Nusrat J Quddus
(74) *Attorney, Agent, or Firm*—Robert F. Hightower

(57) ABSTRACT

In one embodiment, a soft-start circuit is configured to form drive pulses that increase in width independently of the current through the power switch during a first portion of the soft-start operation period.

20 Claims, 4 Drawing Sheets

US 7,719,249 B2

SOFT-START CIRCUIT AND METHOD THEREFOR

BACKGROUND OF THE INVENTION

The present invention relates, in general, to electronics, and more particularly, to methods of forming semiconductor devices and structure.

In the past, the electronics industry utilized various methods and structures to form soft-start circuits for power controllers of power supply systems. For example the soft-start circuit of a pulse width modulated (PWM) or other type of switching power supply controller. An example of such a switching power supply controller is the TEA1507 OR TEA1533 supplied by Philips Semiconductors of Eindhoven, Netherlands. Typically the soft-start circuit allowed the current supplied to the load to increase over a given time period while the output voltage was slowly increasing from zero to a desired output voltage value. Often, the first pulse of current that the soft-start circuit allowed the power supply controller to supply to the system was large and successive pulses of current increased from the initial current pulse. One problem with the prior soft-start circuits was that the initial large current pulse produced undesirable audible noise.

Accordingly, it is desirable to have a soft-start circuit that does not create audible noise during the soft-start period of operation of the power supply controller.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

Figure 1:
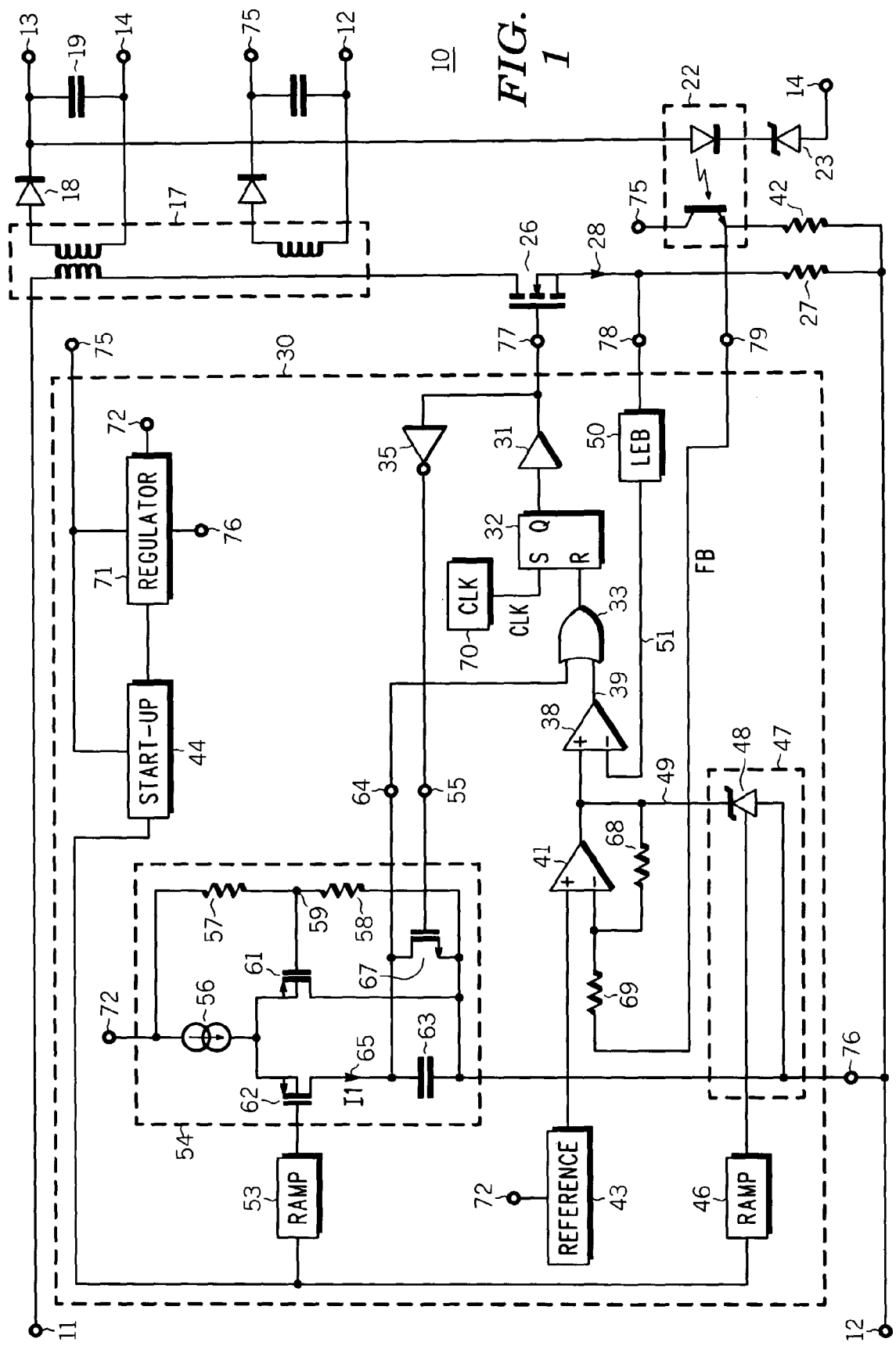
FIG. 1 schematically illustrates a portion of an embodiment of a power supply control system having a power supply controller in accordance with the present invention.

FIG. 1 schematically illustrates a portion of an embodiment of a power supply control system 10 that includes a switching power supply controller 30. Controller 30 is formed to include a soft-start circuit that reduces audible noise during the soft-start portion of the operation of controller 30 and system 10. System 10 receives power, such as a rectified dc voltage, between a power input terminal 11 and a power return terminal 12 and forms a regulated output voltage between an output 13 and an output return 14. System 10 generally includes a transformer 17 that generally has a primary side connected to receive the voltage from terminal 11, a secondary connected to supply power to a load (not shown) connected between output 13 and return 14, and an auxiliary winding that is used to supply a lower voltage power source between return 12 and an output that is connected to a voltage input 75 of controller 30. A power switch or power transistor 26 of system 10 is connected to the primary of transformer 17 in order to control a switch current 28 that flows through transformer 17. System 10 also typically includes a current sense resistor 27, a blocking diode 18, an output storage capacitor 19, an opto coupler 22, and a zener diode 23. Coupler 22 is connected to receive the voltage on output 13 and provide a feedback (FB) signal on an output of coupler 22 that is representative of the value of the voltage between output 13 and return 14. Those skilled in the art will appreciate that coupler 22 and diode 23 may, be replaced by other feedback circuits that are well-known to those skilled in the art. Resistor 27 receives current 28 from transistor 26 and forms a current sense signal that is representative of current 28. Transistor 26 and resistor 27 typically are external to controller 30 but may be included within controller 30 in other embodiments.

Controller 30 generally includes a clock 70, a switch control latch 32, a transistor driver 31, a leading edge blanking (LEB) circuit or LEB 50, a current control comparator 38, an error amplifier 41, a voltage reference or reference 43, an internal regulator or regulator 71, a start-up circuit or start-up 44, a first pulse width controller 54, a second pulse width controller 47, a first ramp generator or ramp 53, a second ramp generator or ramp 46, an OR gate 33, and an inverter 35. Controllers 54 and 47 form the soft-start circuit of controller 30. In the one embodiment, the soft-start circuit is configured to control the width of the pulses of current 28 to initially start small and to gradually increase independently of the value of current 28, and preferably non-linearly with respect to time, during a first portion of the soft-start operation period and to increase dependently of current 28, and preferably linearly, during a second portion of the soft-start operation period in order to minimize audible noise during the soft-start period of operation. Preferably, current 28 is controlled as a function of time during the first portion of the soft-start operation period. In other embodiments, the soft-start circuit may be configured to control current 28 linearly and independently of current 28 during the first portion of the soft-start operation period. Controller 30 is operably configured to receive power between voltage input 75 and a voltage return 76 and responsively generate a switching drive signal on a switching output 77 that controls the operation of transistor 26. Regulator 71 is connected between input 75 and return 76 in order to receive the input voltage and generate an internal operating voltage, on an output 72, for operating the elements of controller 30 such as latch 32, gate 33, inverter 35, comparator 38, and amplifier 41. Start-up 44 is also connected between input 75 and return 76 in order to receive the input voltage and supply a control signal to regulator 71 and ramps 46 and 53 that inhibits the operation of controller 30 and ramps 46 and 53 until the value of the input voltage between input 75 and return 76 has reached a value that is sufficient to ensure proper operation of the elements of controller 30. Circuits such as start-up 44 are well-known to those skilled in the art. An example of such a circuit is disclosed in U.S. Pat. No. 5,477, 175 that issued to Tisinger on Dec. 19, 1995 which is hereby incorporated herein by reference. An example of a circuit that includes a similar start-up function is the NCP1203 from ON Semiconductor of Phoenix Ariz. as disclosed by the data sheet therefor dated October 2004. Those skilled in the art will realize that controller 30 may include other circuits that form other functions that are not shown in FIG. 1 such as under-voltage lock-out, over-voltage protection, brown-out protection, and other well known controller functions.

As will be seen further hereinafter, controller 54 is formed to receive a control signal and responsively generate a delay with a period of the delay increasing non-linearly over time for each successive activation of the control signal. Controller 54 includes a current source 56, a first transistor 61 and a second transistor 62 that are configured as a differential pair, a timing capacitor 63, a reset transistor 67, a reset input 55, a disable output 64, and resistors 57 and 58 that are configured to provide a reference voltage on a reference node 59. Resistors 57 and 58 form a reference voltage that is applied to transistor 61. It will be appreciated that resistors 57 and 58 may be replaced by any circuit that provides a reference that applies the desired reference voltage to transistor 61. The value of the reference voltage and the value of the output of ramp 53 determine the amount of current from source 56 that is conducted through transistor 62. The output of ramp 53 starts at a low value, substantially equal to the value of return 76, and increases over time. As the value of ramp 53 increases, transistor 62 conducts less current, thus, the value of a current 65 that flows through transistor 62 decreases over time. Once the voltage from ramp 53 is greater than the reference voltage, transistor 61 conducts the majority of the current from source 56 which decreases current 65 even further and greatly increases the amount of time required to charge capacitor 63. The value of current 65 can be expressed as:

$$I65=0.5*Mp*Cx*W*((V62gs-V62th)^2/L)$$

Where:
I65=the value of current 65,
Mp=hole mobility,
Cx=Capacitance of gate insulator of transistor 62,
V62gs=gate to source voltage of transistor 62,
V62th=the threshold voltage of transistor 62,
W=the width of transistor 62, and
L=the channel length of transistor 62.

As will be noticed by those skilled in the art, the gate-to-source voltage of transistor 62 is determined by the value of the output of ramp 53. As shown by the equation, as the gate-to-source voltage of transistor 62 varies the value of current 65 varies non-linearly due to the second order quadratic nature of the equation. Those skilled in the art will appreciate that circuits that implement other non-linear and other quadratic equations or parabolic equations or hyperbolic equations or even linear equations may be used. The reference voltage applied to transistor 61 by resistors 57 and 58 determines the amount of current from source 56 that is conducted through transistor 62 based on the voltage from ramp 53. Once the voltage from ramp 53 is greater than the reference voltage, transistor 61 conducts the majority of the current from source 56.

Controller 47 includes a shunt regulator 48 that regulates the value of the voltage on an output 49 of controller 47. If the value of ramp 46 is approximately zero, the output of regulator 48 and output 49 is at a minimum voltage value (Vm) that is set by the output structure of regulator 48. Typically, Vm is about eighty to ninety (80-90) milli-volts greater than return 76. As the value of ramp 46 increases past Vm, the output of regulator 48 begins to increase with a slope similar to the slope of ramp 46. The output of regulator 48 increases until reaching a maximum output value (Vz) and regulator 48 clamps output 49 to a clamp voltage Vz. Typically, Vz is about one volt (1 V) greater than return 76. Such shunt regulators and the operation thereof are well known to those skilled in the art. One example of such a shunt regulator is a TL431 sold by ON Semiconductor of Phoenix Ariz. The value of output 49 is the result of either the minimum voltage delivered by regulator 48 (Vm), or the voltage provided by the output of amplifier 41, or the maximum voltage delivered by regulator 48 (Vz). If the output of amplifier 41 is less than the output of regulator 48, output 49 follows the output of amplifier 41. This case corresponds to controller 30 entering into closed loop regulation through the feedback loop. If the output of amplifier 41 is greater than the output of regulator 48, regulator 48 clamps output 49 to the value of the output of regulator 48.

Figure 2:
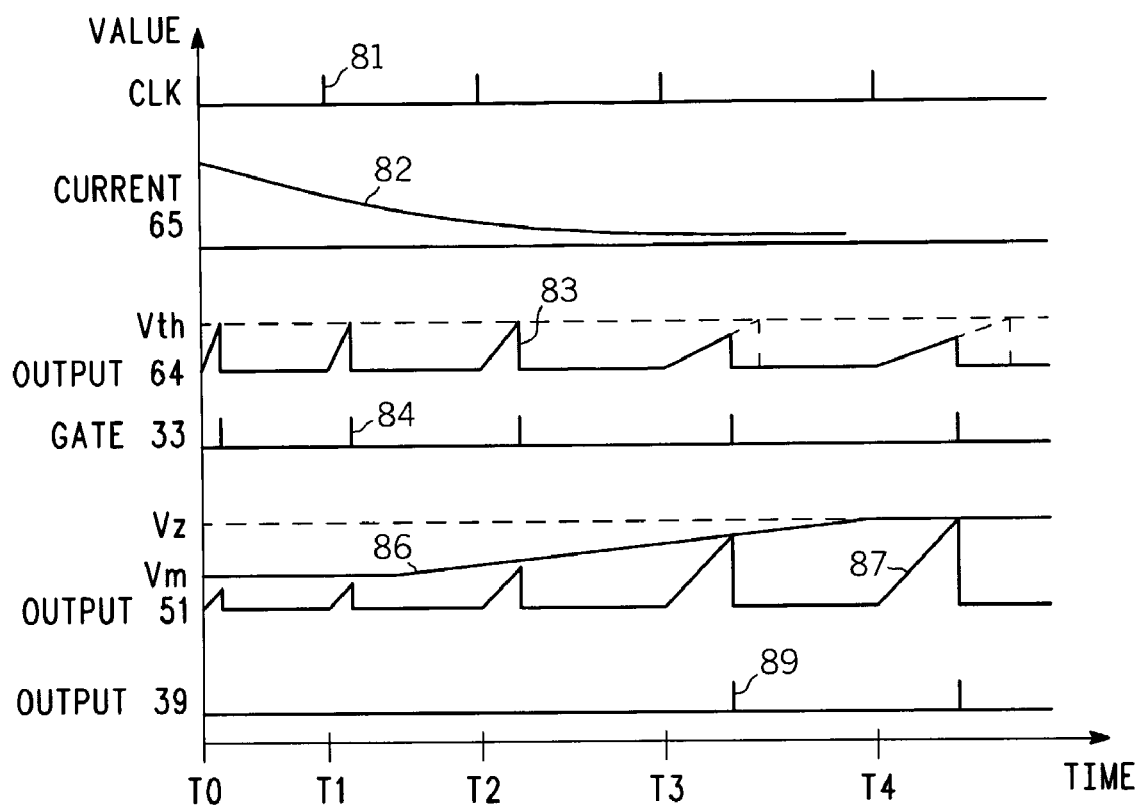
FIG. 2 is a graph illustrating plots of various signals of the power supply controller of FIG. 1 in accordance with the present invention.

FIG. 2 is a graph illustrating plots of various signals within controller 30. The abscissa indicates increasing time and the ordinate indicates, in a general manner, the value of the signal. A plot 81 illustrates a clock signal (CLK) on the output of clock 70, a plot 82 illustrates the value of current 65 of soft-start controller 54, a plot 83 illustrates in a general manner the width of a disable signal on output 64 of controller 54, a plot 84 illustrates the switching output signal on output 77, a plot 86 illustrates the signal on output 49 of controller 47, a plot 87 illustrates the current sense signal on output 51 of LEB 50, and a plot 89 illustrates the signal on output 39 of comparator 38. This description has references to both FIG. 1 and FIG. 2.

When power is first applied between terminals 11 and 12, output storage capacitor 19 typically is discharged and the output voltage between output 13 and return 14 typically is approximately zero. Additionally, the voltage on output 72 of regulator 71 is also approximately zero (approximately the value of return 76). As the value of the voltage between terminals 11 and 12 increases, start-up 44 receives the input voltage and typically supplies a current to regulator 71 to facilitate regulator 71 creating the internal operating voltage on output 72. Prior to a time T0 (see FIG. 2), regulator 71 is not yet supplying the internal operating voltage to operate controller 30, the output of ramps 46 and 53 are both approximately zero (approximately equal to the value of return 76), latch 32 is reset, and output 77 is approximately zero.

Approximately at time T0, the output of start-up 44 becomes active and regulator 71 supplies the operating voltage. Output 77 is low which forces reset input 55 of controller 54 high through inverter 35. The high on input 55 enables transistor 67 to discharge capacitor 63 and force disable output 64 low. The low on output 64 releases gate 33 to be controlled by output 39 of comparator 38. The output of ramp 46 is low but the output of regulator 48 holds output 49 at Vm. This is illustrated by value Vm of plot 86. Since current 28 is approximately zero and output 49 is greater than zero, comparator 38 forces output 39 low. Thus, the output of gate 33 is also low. Ramp 53 and ramp 46 both begin generating a ramp signal in response to the active output of start-up 44. As can be seen in plot 82 at time T0, the low voltage from the output of ramp 53 enables transistor 62 to conduct a large value of current from current source 56. Since transistor 67 is enabled, current 65 does not charge capacitor 63 but is conducted or steered by transistor 67 to return 76. The low output of ramp 46 has no effect on output 49 of controller 47 because the output of regulator 48 has clamped output 49 to approximately Vm as described previously.

Referring to plot 81 at time T0, CLK goes high to set latch 32 and force output 77 high to begin enabling transistor 26. The high from latch 32 also negates the reset signal and forces input 55 low, through inverter 35, thereby disabling transistor 67 and allowing current 65 to begin charging capacitor 63. Since output 64 is less than the threshold voltage of gate 33 (Vth), the output of gate 33 is not affected. The input of gate 33 that is connected to output 64 facilitates gate 33 functioning as a comparator. As illustrated by plot 82, since the output of ramp 53 is low, transistor 62 conducts the majority of current from source 56 and the value of current 65 is large thereby rapidly charging capacitor 63 and forcing the disable signal on output 64 to quickly reach the value of the threshold voltage (Vth) of gate 33. Because current 65 is large, capacitor 63 is charged to Vth before the value of current 28 increases to a value that causes output 51 of LEB 50 to reach the value on output 49 of controller 47, thus, output 39 of comparator 38 is unaffected by current 28. Once output 64 reaches Vth, the output of gate 33 goes high forcing the reset input of latch 32 high to reset latch 32 and force output 77 low to begin disabling transistor 26. The low from latch 32 also forces reset input 55 high to enable transistor 67 thereby discharging capacitor 63 and forcing output 64 low. The low from output 64 releases gate 33 and allows the output of comparator 38 to control the output of gate 33.

Subsequently, at time T1, CLK again goes high to set latch 32 and force output 77 high to begin enabling transistor 26. The high from output 77 forces input 55 low and disables transistor 67 thereby allowing current 65 to begin charging capacitor 63. The output of ramp 53 has increased which reduces the conduction of transistor 62 and the value of current 65 non-linearly with time as described in the description of the second order quadratic equation hereinbefore and illustrated by plot 82. The lower value of current 65 takes longer to charge capacitor 63 to Vth as illustrated by plot 83. During this charging time, transistor 26 remains enabled and the value of current 28 increases as illustrated by plot 87. However, capacitor 63 charges to Vth before the value of current 28 increases to a value that causes output 51 of LEB 50 to reach the value on output 49 of controller 47, thus, output 39 of comparator 38 is unaffected by current 28. Capacitor 63 charges to Vth and gate 33 forces the reset input of latch 32 high to force output 77 low and begin disabling transistor 26. The low from output 77 forces input 55 high thereby enabling transistor 67 to again discharge capacitor 63 and pull output 64 low. This same sequence occurs at a time T2. However, the output of ramp 53 has increased further and the period of the delay time further increases non-linearly as a function of time. As can be seen, for a first portion of the soft-start period of operation controller 54 controls the width of the pulses of the switching drive signal on output 77, thus the width of the pulses of current 28, independently of the value of current 28. For the preferred embodiment of controller 54 illustrated in FIG. 2, is configured to increase the width of successive pulses of the switching drive signal, thus the width of the pulses of current 28, non-linearly as a function of time.

At a time T3, CLK again goes high setting latch 32 and forcing output 77 high to begin enabling transistor 26. The high on output 77 forces input 55 low thereby disabling transistor 67 and allowing current 65 to begin charging capacitor 63. Because the value of ramp 53 has increased, current 65 has non-linearly decreased further as illustrated by plot 82, thus, the delay time formed by controller 54 and the amount of time required to charge capacitor 63 to Vth once again has increased non-linearly with time as illustrated by plot 83. Additionally, the output of ramp 46 has increased causing output 49 to increase. Ramp 46 may increase faster or slower or the same as ramp 53. Because the value of output 49 has increased, the value of output 51 must also achieve a larger value before forcing output 39 of comparator 38 high. During the time that capacitor 63 is charging, transistor 26 is enabled and the value of current 28 increases causing output 51 to increase above the value of output 49. Consequently, output 39 goes high prior to output 64 reaching Vth. The high from output 39 resets latch 32 thereby forcing output 77 low to begin disabling transistor 26. This is illustrated by plot 87 reaching the value of plot 86. A dashed portion of plot 83 indicates the value output 64 would reach if not reset by comparator 38. Since comparator 38 is now resetting latch 32, the first portion of the soft-start operation ends and transitions to the second portion of the soft-start operation. For the embodiment illustrated in FIG. 1, for the second portion of the soft-start operation the width of the pulses of current 28 are controlled by the value of current 28 and the width of the pulses of current 28 is increased based upon the shape, preferably linearly, of ramp 46 until the output of regulator 49 reaches Vz. As before, the low from output 77 forces input 55 high to reset controller 54.

At a time T4, clock 70 once again forces CLK high to set latch 32 and force output 77 high to begin enabling transistor 26. The high on output 77 forces input 55 low and allows current 65 to begin charging capacitor 63. Since the value of ramp 53 has increased further, the value of current 65 has further decreased non-linearly as illustrated by plot 82 just after time T4. While capacitor 63 is charging, current 28 increases and increases the value of output 51 of LEB 50 as illustrated by plot 87. Since current 65 has decreased, output 51 increases to a value that is greater than the value on output 49 before output 64 can charge to Vth. Thus, output 39 goes high to reset latch 32 prior to output 64 increasing to Vth. Since output 49 has linearly increased in value from T3 to T4, the width of the pulse of the switching output signal also linearly increases. Subsequently, the value of ramp 53 increases thereby non-linearly decreasing current 65 to a value that is insufficient to charge capacitor 63 to Vth prior to current 28 reaching a value that causes output 39 to reset latch 32.

After the output of ramp 46 has increased to a value that causes the output of regulator 48 to clamp output 49 to Vz, the soft-start period of operation of controller 30 ends and the operation of controller 30 is controlled the closed control loop of clock 70, latch 32, driver 31, the feedback signal received by amplifier 41 from input 79, and the current sense signal receive on input 78. Thus it can be seen that the soft-start period of operation includes a first operation period for increasing the width of the pulses of the switching control signal, thus the pulses of switch current 28, independently of current 28 and preferably non-linearly as a function of time and a second operation period for increasing the width of the switching control signal, thus the pulses of switch current 28, as a function, preferably linearly, of current 28. It should be noted that the width of the switching control signal pulses during the first operation period begin very small and increase typically with each successive pulse. Prior art controllers without controller 54 have a large initial pulse width that causes audible noise. Controller 54 is formed to generate initial pulses with a small width and increase the width in order to minimize audible noise.

In order to facilitate this functionality, terminal 11 is connected to a first terminal of transformer 17, and terminal 12 is connected to both return 76, a return terminal of the auxiliary winding of transformer 17, and a first terminal of resistor 27. A second terminal of resistor 27 is connected to input 78 and to a source of transistor 26. A gate of transistor 26 is connected to output 77, and a drain is connected to a second terminal of transformer 17. Input 75 is connected to a second terminal of the auxiliary winding of transformer 17, an input of regulator 71, and an input of start-up 44. A first output of start-up 44 is connected to a control input of regulator 71, and a second output of start-up 44 is commonly connected to a control input of ramps 46 and 53. The CLK output of clock 70 is connected to the set input of latch 32, and a Q output of latch 32 is connected to an input of driver 31. An output of driver 31 is connected to output 77 and to an input of inverter 35. An output of inverter 35 is connected to input 55 of controller 54. Output 64 of controller 54 is connected to a first input of gate 33 which has an output connected to the reset input of latch 32. Input 55 is connected to a gate of transistor 67 which has a source commonly connected to return 76, a drain of transistor 61 and a first terminal of capacitor 63. A second terminal of capacitor 63 is commonly connected to a drain of transistor 62, a drain of transistor 67, and output 64. A source of transistor 62 is commonly connected to a source of transistor 61 and to an output terminal of source 56. A gate of transistor 62 is connected to an output of ramp 53. A gate of transistor 61 is commonly connected to a first terminal of resistors 57 and 58. A second terminal of resistor 58 is connected to return 76. A second terminal of resistor 57 is commonly connected to output 72 of regulator 71 and an input terminal of source 56. An inverting input of amplifier 41 is connected to an output of reference 43. A non-inverting input of amplifier 41 is connected to a first terminal of a resistor 69 and to a first terminal of a resistor 68 which has a second terminal commonly connected to input 79 of controller 30 and to a first terminal of a resistor 42. A second terminal of resistor 69 is connected to the output of amplifier 41. A second terminal of resistor 42 is connected to output 72 of regulator 71. The output of amplifier 41 is commonly connected to a non-inverting input of comparator 38 and output 49 of controller 47. A first terminal of regulator 48 is connected to return 76, a second terminal of regulator 48 is connected to output 49, and a control terminal is connected to the output of ramp 46. An inverting input of comparator 38 is connected to output 51 of LEB 50 which has an input connected to input 78 of controller 30. Output 39 of comparator 38 is connected to a second input of gate 33.

Figure 3:
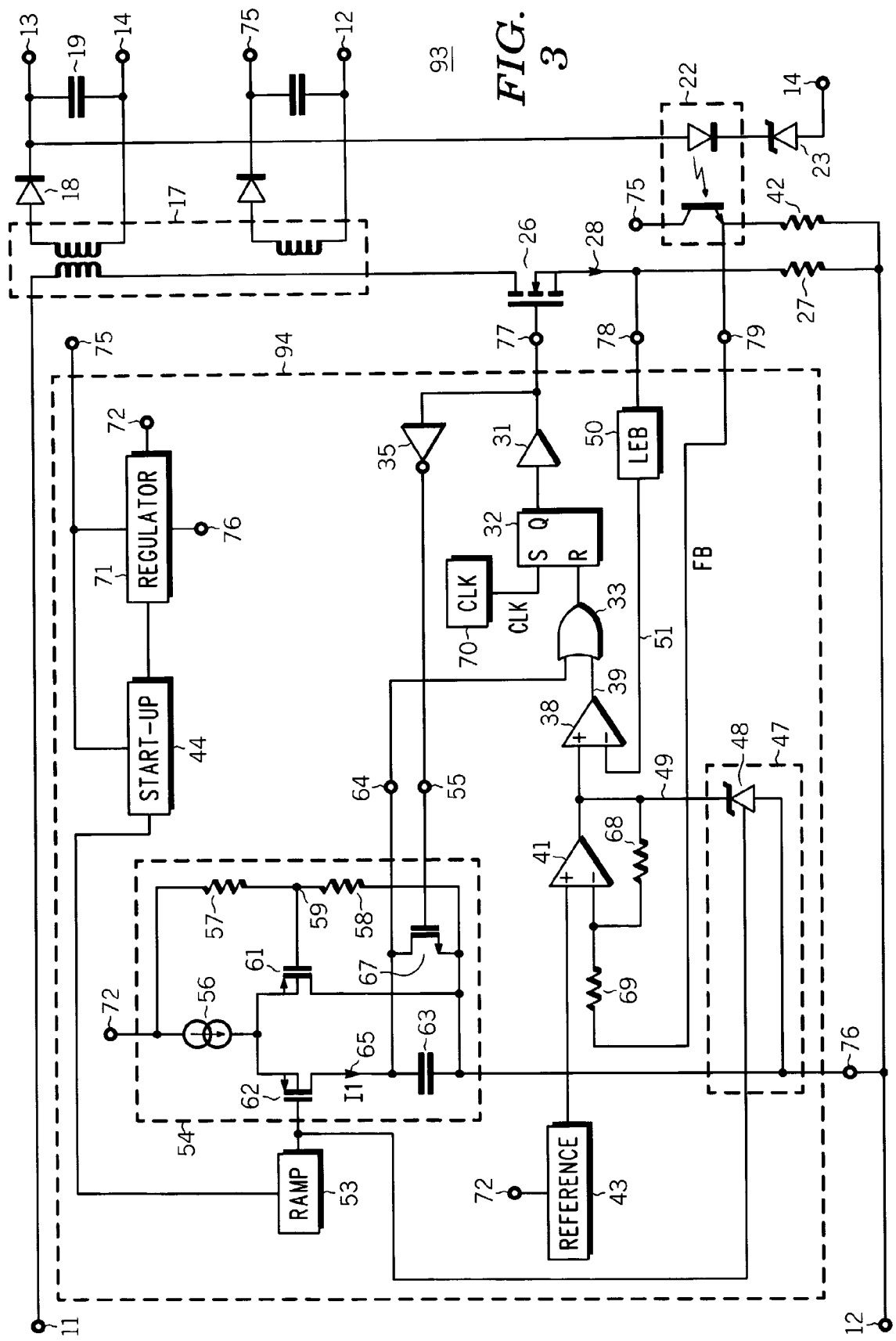
FIG. 3 schematically illustrates an alternate embodiment of the power supply control system of FIG. 1 in accordance with the present invention.

FIG. 3 schematically illustrates a portion of an embodiment of a power supply control system 93 that includes a switching power supply controller 94. System 93 and controller 94 are alternate embodiments of respective system 10 and controller 30 explained in the description of FIG. 1 and FIG. 2. Controller 94 is similar to controller 30 except that ramp 53 is used to form the ramp signal for both controller 54 and controller 47.

Figure 4:
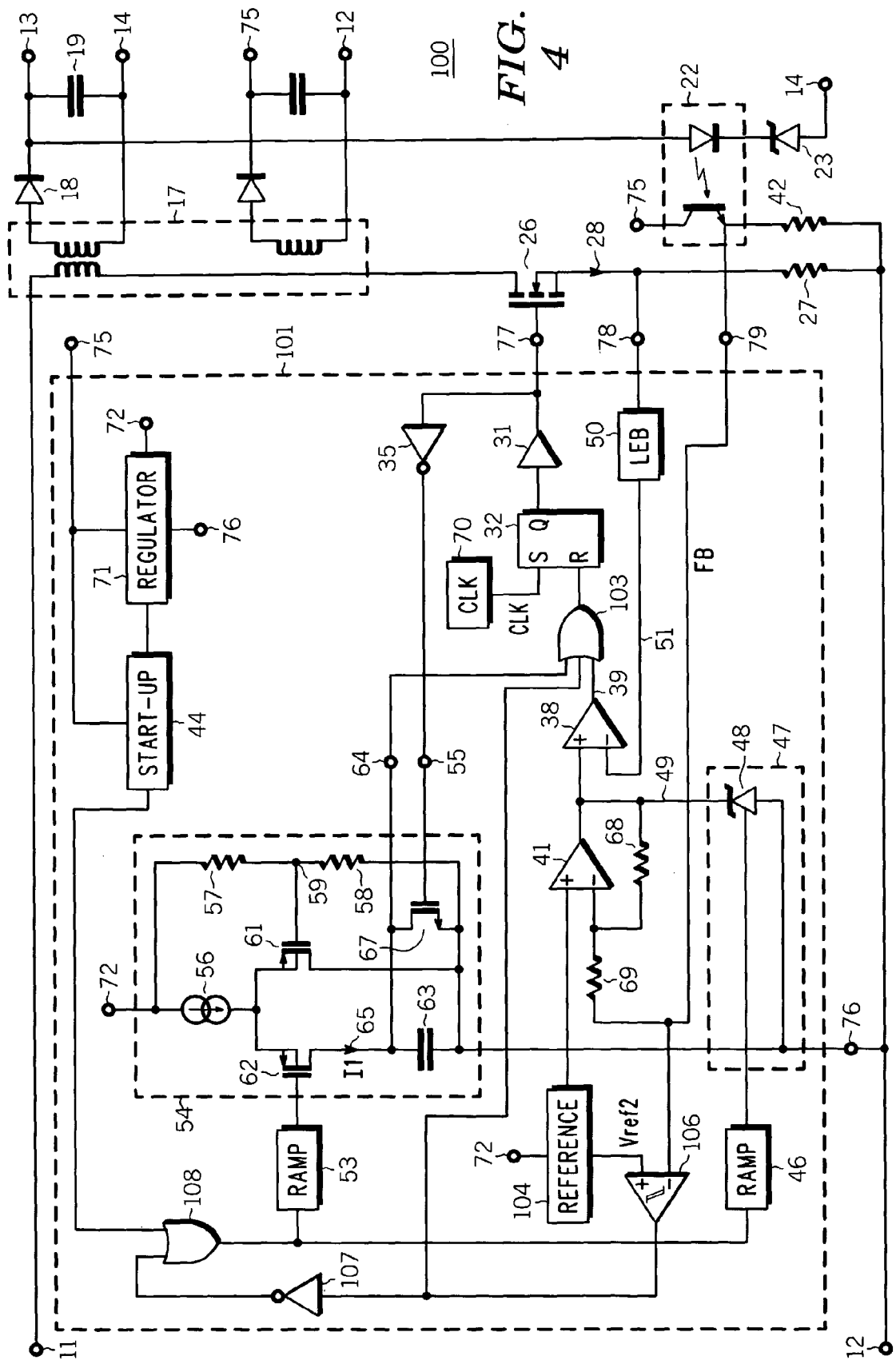
FIG. 4 schematically illustrates another alternate embodiment of the power supply control system of FIG. 1 in accordance with the present invention.

FIG. 4 schematically illustrates a portion of an embodiment of a power supply control system 100 that includes a switching power supply controller 101. System 100 and controller 101 are alternate embodiments of respective system 10 and controller 30 explained in the description of FIG. 1 and FIG. 2. Controller 101 is similar to controller 30 except that controller 101 includes a burst-mode or skip-mode comparator 106, an inverter 107, and an OR gate 108 that facilitates operating controller 101 in a low power burst-mode or skip-mode that includes soft-start operation. Controller 101 also includes a reference generator of reference 104 that is similar to reference 43 except that reference 104 forms a second reference voltage (Vref2) on a second output that is used to facilitate the skip-mode. As is well known by those skilled in the art, if the current required by the load (not shown) that is connected between output 13 and return 14 is very low, it is desirable to reduce the power dissipation of system 100 by operating system 100 in a burst-mode or skip-mode of operation. If the current required by the load once again increases, it is desirable to discontinue the skip-mode of operation and return to normal closed loop operation. System 100 and controller 101 are configured to minimize audible noise resulting from such a transition between skip-mode and closed loop operation.

If the value of the feedback (FB) signal on input 79 is lower than the second reference voltage (Vref2) from reference 104, the output of comparator 106 is forced high to reset latch 32 through gate 103 thereby inhibiting switching of transistor 26 and entering the skip-mode. As a result, the value of the output voltage decreases and correspondingly increases the value of the FB signal. If FB becomes greater than the sum of Vref2 plus the hysteresis of comparator 106, the output of comparator 106 is forced low to release latch 32 and allow CLK to set latch 32. The low from comparator 106 also forces the output of gate 108 high to start a ramp generation cycle from ramps 46 and 53 thereby beginning a soft-start operation that controls the width of the pulses the switching control signal and the corresponding pulses of current 28 as described hereinbefore in the description of FIG. 1 and FIG. 2. Thus, the soft-start operation is useful for minimizing audible noise at start-up and also when transition from a skip-mode to a closed loop operating mode.

Figure 5:
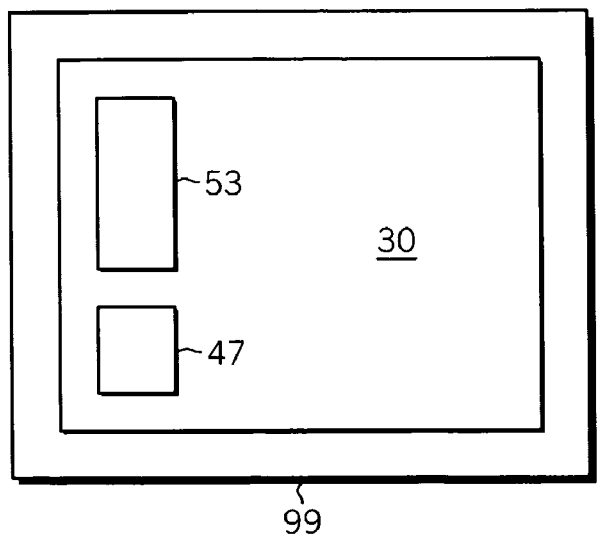
FIG. 5 schematically illustrates an enlarged plan view of a semiconductor device that includes the power supply controller of FIG. 1 in accordance with the present invention.

FIG. 5 schematically illustrates an enlarged plan view of a portion of an embodiment of a semiconductor device 98 that is formed on a semiconductor die 99. Controller 30 is formed on die 99. Die 99 may also include other circuits that are not shown in FIG. 4 for simplicity of the drawing. Controller 30 and device 98 are formed on die 99 by semiconductor manufacturing techniques that are well known to those skilled in the art.

In view of all of the above, it is evident that a novel device and method is disclosed. Included, among other features, is forming a soft-start period of operation including a first operation period for increasing the width of the pulses of switch current 28 independently of the value of the switch current and preferably non-linearly as a function of time, and a second operation period for increasing the width of the switch current pulses as a function of the value of the switch current and preferably linearly. The width of the switching pulses during the first operation period have a small width in order to minimize audible noise.

While the invention is described with specific preferred embodiments, it is evident that many alternatives and variations will be apparent to those skilled in the semiconductor arts. For example the function used to control the width of the pulses or the active state of the switching control signal is described using a preferred embodiment of a control circuit that controls the widths using a second order quadratic equation. Other circuits that implement other non-linear equations may also be used. Additionally, circuits that implement a linear equation may be used but care should be taken to ensure no interaction with the linear circuit used for the second portion of the soft-start operation period. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A method of operating a power supply controller comprising:

generating a switching control signal that is formed to enable a power switch to regulate an output voltage to a regulated value during a closed-loop operating mode of the power supply controller; and controlling a pulse width of active states of the switching control signal independently of current flow through the power switch and independently of a value of the output voltage during a first time period and controlling the pulse width of active states of the switching control signal responsively to current flow through the power switch during a second time period that is successive to the first time period wherein the power supply controller does not control the regulated value of the output voltage in the closed-loop operating mode during the first time period and the second time period.

2. The method of claim 1 wherein controlling the pulse width of active states of the switching control signal independently of current flow through the power switch includes controlling the pulse width of a first set of active states of the switching control signal as a function of time during the first time period.

3. The method of claim 1 wherein controlling the pulse width of active states of the switching control signal independently of current flow through the power switch includes increasing the pulse width of each successive active state of a first set of the active states non-linearly as a function of time.

4. The method of claim 3 wherein increasing the pulse width of each successive active state increasing the pulse width of each successive active state according to a quadratic equation.

5. The method of claim 4 wherein increasing the pulse width of each successive active state includes non-linearly increasing a value of a current flow through a first transistor.

6. The method of claim 2 wherein controlling the pulse width of active states of the switching control signal responsively to current flow through the power switch during the second time period that is successive to the first time period includes increasing a pulse width of each successive active state of a second set of active states of the switching control signal during the second time period.

7. The method of claim 1 wherein controlling the pulse width of active states of the switching control signal independently of current flow through the power switch includes forming a first active state of the switching control signal, delaying a first delay time, forming a first inactive state of the switching control signal, forming a second active state of the switching control signal, non-linearly increasing the first delay time to form a second delay time and delaying the second time period, and forming a second inactive state of the switching control signal.

8. A method of forming a soft-start circuit of a power supply controller comprising:

configuring the power supply controller to form a switching drive signal to operably control a value of a switch current that flows through a power switch and regulate an output voltage to a regulated value responsively to a signal that is representative of the output voltage during a closed-loop operating mode of the power supply controller;

configuring the soft-start circuit to form continuously increasing pulse widths of successive active states of the switching drive signal independently of a value of the switch current and independently of a value of the output voltage during a first portion of a soft-start operation period of the power supply controller; and configuring the soft-start circuit to increase the pulse widths as a function of the switch current during a second portion of the soft-start operation period of the power supply controller wherein the power supply controller does not control the regulated value of the output voltage in the closed-loop operating mode during the first and second portions of the soft-start operation period.

9. The method of claim 8 wherein configuring the soft-start circuit to form continuously increasing pulse widths of successive active states of the switching drive signal independently of the value of the switch current includes configuring the soft-start circuit to increase pulse widths of successive active states non-linearly as a function of time during the first portion of the soft-start operation period.

10. The method of claim 8 wherein configuring the soft-start circuit to form continuously increasing pulse widths of successive active states of the switching drive signal includes configuring the power supply controller to form the switching drive signal having an active state to enable a the power switch; and configuring the soft-start circuit to form an inactive state of the switching drive signal a first time period after enabling the power switch wherein the soft-start circuit is configured to increases the first time period non-linearly for a successive active state of the switching drive signal during the first portion of the soft-start operation period.

11. The method of claim 10 wherein configuring the soft-start circuit to form the inactive state of the switching drive signal the first time period after enabling the power switch includes configuring a first control circuit to receive the switching drive signal, delay the first time period, and responsively negate the switching drive signal.

12. The method of claim 8 wherein configuring the soft-start circuit to form continuously increasing pulse widths of successive active states of the switching drive signal independently of the value of the switch current includes configuring the soft-start circuit to increase each successive pulse width of a first set of active states of the switching drive signal non-linearly during the first portion of the soft-start operation period.

13. The method of claim 12 wherein configuring the soft-start circuit to increase each successive pulse width of the first set of active states of the switching drive signal non-linearly during the first portion of the soft-start operation period includes configuring a first pulse width controller to form a first current that changes value non-linearly during the first portion of the soft-start operation period, coupling a capacitor to receive the first current to charge the capacitor, and coupling the capacitor to receive the first current to charge the capacitor responsively to an active state of the switching drive signal.

14. The method of claim 13 further including configuring the first pulse width controller to discharge the capacitor responsively to receiving an inactive state of the switching drive signal.

15. The method of claim 13 wherein configuring the first pulse width controller to form the first current that changes value non-linearly during the first portion of the soft-start operation period includes configuring a first transistor of a differential pair to receive a ramp signal and responsively change a value of the first current responsively to the ramp signal.

16. A soft-start circuit of a power supply controller comprising:

a first ramp circuit configured to form a first ramp that increases in value over a first time interval;

a first transistor coupled to receive the first ramp signal and responsively form a first current that decreases in value over the first time interval;

a capacitor coupled to receive the first current and form an active state of an output signal of the soft-start circuit; and a second transistor coupled to receive a control signal and responsively form a disable state of the output signal.

17. The soft-start circuit of claim 16 wherein the first transistor coupled to receive the first ramp signal and responsively form the first current includes the first ramp generator having an output coupled to a control electrode of the first transistor, a current source coupled to a first current carrying electrode of the first transistor, and a second current carrying electrode of the first transistor coupled to a first terminal of the capacitor.

18. A soft-start circuit of a power supply controller comprising:

a first ramp circuit configured to form a first ramp that increases in value over a first time interval;

a first transistor coupled to receive the first ramp signal and responsively form a first current that decreases in value over the first time interval;

a capacitor coupled to receive the first current and form an active state of an output signal of the soft-start circuit;

a second transistor coupled to receive a control signal and responsively form a disable state of the output signal, a first current carrying electrode of the second transistor coupled to an output of the soft-start circuit, to a terminal of the capacitor, and to a current carrying electrode of the first transistor; and a third transistor coupled to the first transistor to form a differential pair, and a reference coupled to a control electrode of the third transistor.

19. The soft-start circuit of claim 16 wherein the power supply controller is configured to generate a switching control signal to enable a power switch in order to regulate an output voltage to a regulated value during a closed-loop operating mode of the power supply controller; and further including a second ramp circuit configured to form a second ramp that increases in value over a second time interval wherein the power supply controller does not regulate the output voltage in the closed-loop operating mode during the second time interval.

20. The soft-start circuit of claim 16 wherein the power supply controller is configured to generate a switching control signal that is formed to enable a power switch to regulate an output voltage to a regulated value responsively to a signal that is representative of the output voltage during a closed-loop operating mode of the power supply controller;

further including the power supply controller configured to use the output signal of the soft-start circuit to control a pulse width of active states of the switching control signal independently of current flow through the power switch and independently of a value of the output voltage during the first time interval; and a second ramp circuit configured to form a second ramp that increases in value over a second time interval that is successive to the first time interval wherein the power supply controller configured to control the pulse width of active states of the switching control signal responsively to current flow through the power switch and responsively to the second ramp during the second time interval wherein the power supply controller does not control the regulated value of the output voltage in the closed-loop operating mode during the first time interval and the second time interval.

* * * * *